(12) United States Patent
Lassila et al.

(10) Patent No.: US 6,313,182 B1
(45) Date of Patent: Nov. 6, 2001

(54) ACETYLENIC DIOL ETHYLENE OXIDE/ PROPYLENE OXIDE ADDUCTS AND PROCESSES FOR THEIR MANUFACTURE

(75) Inventors: Kevin Rodney Lassila, Macungie; Paula Ann Uhrin, Allentown, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/304,607

(22) Filed: May 4, 1999

(51) Int. Cl.[7] .................................................. B01D 12/00
(52) U.S. Cl. ............................................................ 516/204
(58) Field of Search ............................................... 516/204

(56) References Cited

U.S. PATENT DOCUMENTS

| | | | |
|---|---|---|---|
| 3,268,593 | 8/1966 | Carpenter et al. | 260/615 |
| 5,098,478 | 3/1992 | Krishnan et al. | 106/23 |
| 5,562,762 | 10/1996 | Mrvos et al. | 106/22 H |
| 5,650,543 | 7/1997 | Medina | 568/616 |

FOREIGN PATENT DOCUMENTS

| | | |
|---|---|---|
| 3063187A | 3/1991 | (JP) . |
| 4071894 | 3/1992 | (JP) . |
| 4091168 | 3/1992 | (JP) . |
| 6279081 | 10/1994 | (JP) . |
| 2569377 | 8/1996 | (JP) . |
| 2621662 | 6/1997 | (JP) . |
| 9150577 | 6/1997 | (JP) . |
| 2636954 | 8/1997 | (JP) . |
| 11352703 | 12/1999 | (JP) . |

OTHER PUBLICATIONS

Schwartz, J. "The Importance of Low Dynamic Surface Tension in Waterborne Coatings", Journal of Coatings Technology, Sep. 1992.

Wirth, W.; Storp, S., Jacobsen, W. "Mechanisms Controlling Leaf Retention of Agricultural Spray Solutions", Pestic. Sci. 1991, 33, 411–420.

Medina, S.W.; Sutovich, M. N., "Using Surfactants to Formulate VOC Complaint Waterbased Inks", Am. Ink Maker 1994, 72 (2) 32–38.

Leeds, et al. I&EC Product Research and Development 1965, 4, 237.

*Primary Examiner*—Edward J. Cain
(74) *Attorney, Agent, or Firm*—Michael Leach

(57) ABSTRACT

This invention provides water-based compositions, particularly coating, ink, fountain solution and agricultural compositions, manifesting reduced equilibrium and dynamic surface tension by the incorporation of a surface tension reducing amount of an acetylenic diol ethylene oxide/propylene oxide adduct of the structure

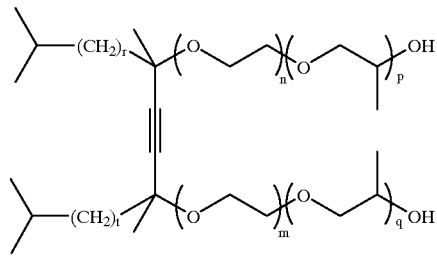

where r and t are 1 or 2, (n+m) is 1 to 30 and (p+q) is 1 to 30.

Also disclosed is a method for making random and block EO/PO adducts of acetylenic diols by reacting an acetylenic diol with EO and/or PO in the presence of a trialkylamine or Lewis acid.

23 Claims, No Drawings

ACETYLENIC DIOL ETHYLENE OXIDE/PROPYLENE OXIDE ADDUCTS AND PROCESSES FOR THEIR MANUFACTURE

FIELD OF THE INVENTION

The invention relates to acetylenic diol alkylene oxide adducts, their manufacture and their use to reduce the surface tension in water-based systems.

BACKGROUND OF THE INVENTION

The ability to reduce the surface tension of water is of great importance in waterborne coatings, inks, adhesives, and agricultural formulations because decreased surface tension translates to enhanced substrate wetting in actual formulations. Surface tension reduction in water-based systems is generally achieved through the addition of surfactants. Performance attributes resulting from the addition of surfactants include enhanced surface coverage, fewer defects, and more uniform distribution. Equilibrium surface tension performance is important when the system is at rest. However, the ability to reduce surface tension under dynamic conditions is of great importance in applications where high surface creation rates are utilized. Such applications include spraying, rolling and brushing of coatings or spraying of agricultural formulations, or high speed gravure or ink-jet printing. Dynamic surface tension is a fundamental quantity which provides a measure of the ability of a surfactant to reduce surface tension and provide wetting under such high speed application conditions.

Traditional nonionic surfactants such as alkylphenol or alcohol ethoxylates, and ethylene oxide (EO)/propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

Surfactants based on acetylenic glycols such as 2,4,7,9-tetramethyl-5-decyne-4,7-diol (1) and its ethoxylates (2) are known for their good balance of equilibrium and dynamic surface-tension-reducing capabilities with few of the negative features of traditional nonionic and anionic surfactants.

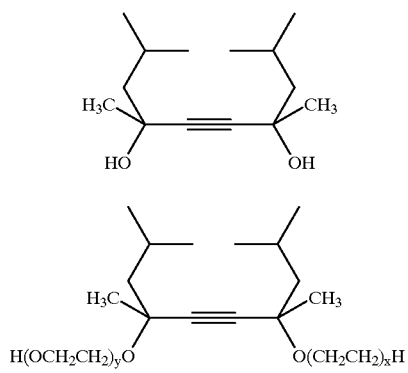

For many applications it would be desirable to produce acetylenic diol derivatives which have alternative properties. For example, in applications in which excellent dynamic performance is required, it is often desirable to have a surfactant which has higher critical aggregation concentration (solubility limit or critical micelle concentration) because higher bulk surfactant concentrations lead to a higher diffusive flux of surfactant to newly created surface, and consequently lower dynamic surface tension. Traditionally, acetylenic diol surfactants with higher water solubility have been obtained by reaction of the parent with ethylene oxide; greater degrees of ethoxylation provide greater water solubility. Unfortunately, increasing the level of ethoxylation also introduces a tendency to foam, introducing inefficiencies during formulation, defects during application, and process issues in other applications.

Low dynamic surface tension is of great importance in the application of waterborne coatings. In an article, Schwartz, J. *"The Importance of Low Dynamic Surface Tension in Waterborne Coatings"*, Journal of Coatings Technology, September 1992, there is a discussion of surface tension properties in waterborne coatings and a discussion of dynamic surface tension in such coatings. Equilibrium and dynamic surface tension were evaluated for several surface active agents. It is pointed out that low dynamic surface tension is an important factor in achieving superior film formation in waterborne coatings. Dynamic coating application methods require surfactants with low dynamic surface tensions in order to prevent defects such as retraction, craters, and foam.

Efficient application of agricultural products is also highly dependent on the dynamic surface tension properties of the formulation. In an article, Wirth, W.; Storp, S.; Jacobsen, W. *"Mechanisms Controlling Leaf Retention of Agricultural Spray Solutions"*; Pestic. Sci. 1991, 33, 411–420, the relationship between the dynamic surface tension of agricultural formulations and the ability of these formulations to be retained on a leaf was studied. These workers observed a good correlation between retention values and dynamic surface tension, with more effective retention of formulations exhibiting low dynamic surface tension.

Low dynamic surface tension is also important in high-speed printing as discussed in the article *"Using Surfactants to Formulate VOC Compliant Waterbased Inks"*, Medina, S. W.; Sutovich, M. N. *Am. Ink Maker* 1994, 72 (2), 32–38. In this article, it is stated that equilibrium surface tensions (ESTs) are pertinent only to ink systems at rest. EST values, however, are not good indicators of performance in the dynamic, high speed printing environment under which the ink is used. Dynamic surface tension is a more appropriate property. This dynamic measurement is an indicator of the ability of the surfactant to migrate to a newly created ink/substrate interface to provide wetting during high speed printing.

U.S. Pat. No. 5,098,478 discloses water-based ink compositions comprising water, a pigment, a nonionic surfactant and a solubilizing agent for the nonionic surfactant. Dynamic surface tension in ink compositions for publication gravure printing must be reduced to a level of about 25 to 40 dynes/cm to assure that printability problems will not be encountered.

U.S. Pat. No. 5,562,762 discloses an aqueous jet ink of water, dissolved dyes and a tertiary amine having two polyethoxylate substituents and that low dynamic surface tension is important in ink jet printing.

In applications which require good dynamic performance and low foaming, acetylenic glycol-based surfactants have become industry standards. The following patents and articles describe various acetylenic alcohols and their ethoxylates as surface active agents:

U.S. Pat. No. 3,268,593 and Leeds, et al, *I&EC Product Research and Development* 1965, 4, 237, disclose ethylene oxide adducts of tertiary acetylenic alcohols represented by the structural formula

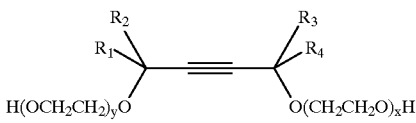

wherein $R_1$ and $R_4$ are alkyl radicals having from 3–10 carbon atoms and $R_2$ and $R_3$ are methyl or ethyl and x and y have a sum in the range of 3 to 60, inclusive. Specific ethylene oxide adducts include the ethylene oxide adducts of 3-methyl-1-nonyn-3-ol, 7,10-dimethyl-8-hexadecyne-7,10-diol; 2,4,7,9-tetramethyl-5-decyne-4,7-diol and 4,7-dimethyl-5-decyne-4,7-diol. Preferably, the ethylene oxide adducts range from 3 to 20 units. Also disclosed is a process for the manufacture of materials of this type using trialkylamine catalysts.

U.S. Pat. No. 4,117,249 discloses 3 to 30 mole ethylene oxide (EO) adducts of acetylenic glycols represented by the structural formula

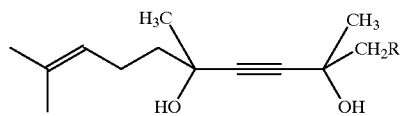

wherein R is hydrogen or an alkenyl radical. The acetylenic glycols are acknowledged as having utility as surface active agents, dispersants, antifoaming nonionic agents, and viscosity stabilizers.

U.S. Pat. No. 5,650,543 discloses ethoxylated acetylenic glycols of the form

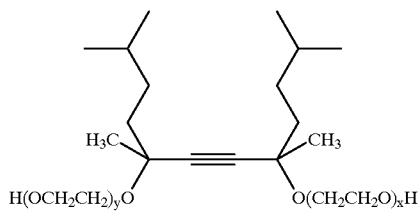

where x and y are integers and the sum is from 2–50. These surfactants are notable because they impart an ability to formulate coating and ink compositions capable of high speed application.

JP 2636954 B2 discloses propylene oxide adducts of formula

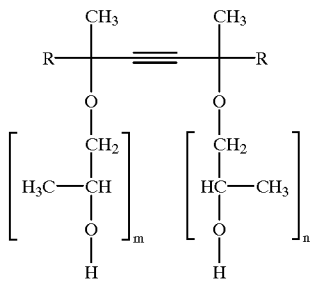

where R=C1–8 alkyl; m+n=integer 1 to 100. These compounds are prepared by reacting acetylenic glycols and propylene oxide in the presence of Lewis acid catalysts such as $BF_3$. It is stated that amine catalysts are inactive for the addition of propylene oxide to acetylenic diols. The propylene oxide adducts are said to be useful as wettability improvers for antirust oil, antifoamers, spreaders for pesticides, and wetting agents for adhesives. They are effective in improving wettability of oils and have improved antifoaming ability.

JP 2621662 B2 describes dye or developing agent dispersions for thermal recording paper containing propylene oxide (PO) derivatives of an acetylenic diol of the form

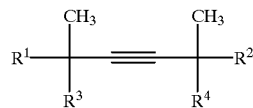

where R1 and R2 are —CH3, —C2H5, —C4H9; R3 and R4 are —(OC3H4)mOH, or —OH where m is an integer 1–10.

JP 04071894 A describes coating solutions containing a dispersion of a colorless electron donating dye precursor and a dispersion of developer. At least one of them contains at least one type of wax having a melting point of at least 60° C. and at least one EO or PO derivative of an acetylenic diol of the formula

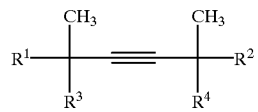

where R1 and R4 each represent methyl, ethyl propyl, or butyl and R2 and R3 are each —(OC2H5)nOH, or —(OC3H6)nOH (n is 1–10), or OH, mixed and dispersed.

JP 2569377 B2 discloses a recording material containing dispersions of a substantially colorless electron donating dye precursor and a developer. When at least one of these dispersions is prepared, at least one of the compounds

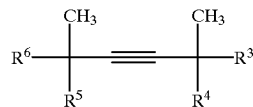

where $R^3$ and $R^6$=methyl, ethyl, propyl or butyl; and $R^4$ and $R^5$=$(OC_2H_4)_mOH$, —$(OC_3H_6)_mOH$ (where m=an integer of 1–10) or —OH is added.

JP 09150577 A discloses a heat sensitive recording medium which contains in the heat sensitive layer a leuco dye and 0.1–1.0 wt % of an ethoxylate or propoxylate of an acetylenic glycol of the form

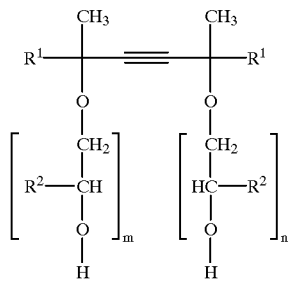

where $R^1$=methyl, ethyl, propyl or butyl; $R^2$=hydrogen or methyl; and n and m=1–10.

JP 04091168 A discloses silica which has been surface treated with compounds of the form

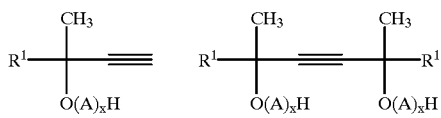

where R1=1–8C alkyl, A=2–3C alkylene glycol residue, R1 and A in a molecule may be the same or different, x and y=each an integer of 0–25.

JP 06279081 A describes a manufacturing process for a cement mortar-concrete hardening material to which 0.5–10 wt. % an acetylenic alcohol or diol alkoxylate is added together with fluorine group surfactants and/or silicon group surfactants. The acetylenic material can be expressed by the formula

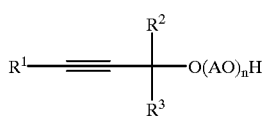

where R1=H or —C(R2)(R3)(O(AO)nH); R2 and R3=1–8C alkyl radicals, A=2–3C alkylene radicals and n=0–30.

JP 03063187 A discloses the use of acetylenic glycol ethylene oxide and/or propylene oxide addition products in concentrated aqueous fountain solution compositions for offset printing. In one example, the 8 to 12 mole ethylene oxide/1 to 2 mole propylene oxide adduct of 3,5-dimethyl-4-octyne-3,5-diol is used in a fountain solution. Other examples illustrate the use of only ethylene oxide derivatives of acetylenic diols.

Although acetylenic diol derivatives containing both ethylene oxide (EO) and propylene oxide (PO) have been taught as a general class of materials, usually as potential extensions of work which had been performed with ethylene oxide derivatives, no actual examples of an acetylenic diol EO/PO derivative based upon 2,4,7,9-tetramethyl-5-decyne-4,7-diol or 2,5,8,11-tetramethyl-6-dodecyne-5,8-diol have been prepared and evaluated. There are no disclosures of any process which could be used to prepare materials of this type.

SUMMARY OF THE INVENTION

This invention provides alkoxylated acetylenic diols which act as surfactants for water based compositions of the following structure:

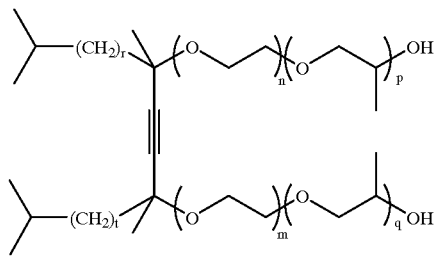

where r and t are, preferably the same, 1 or 2, (n+m) is 1 to 30 and (p+q) is 1 to 30. The EO and PO units may be distributed along the alkylene oxide chain in blocks of EOs and POs or randomly.

This invention also relates to processes for the manufacture of certain alkoxylated acetylenic diols.

Another embodiment of the invention affords water-based compositions containing an organic or inorganic compound, particularly aqueous organic coating, ink, and agricultural compositions, having reduced equilibrium and dynamic surface tension by incorporation of an effective amount of an alkoxylated acetylenic diol of the above structure.

It is desirable that an aqueous solution of the alkoxylated acetylenic diol demonstrates a dynamic surface tension of less than 35 dynes/cm at a concentration of ≦0.5 wt % in water at 23° C. and 1 bubble/second according to the maximum-bubble pressure method. The maximum-bubble-pressure method of measuring surface tension is described in *Langmuir* 1986, 2, 428–432, which is incorporated by reference.

Also provided is a method for lowering the equilibrium and dynamic surface tension of aqueous compositions by the incorporation of these alkoxylated acetylenic diol compounds.

Also provided is a method for applying a water-based inorganic or organic compound-containing composition to a surface to partially or fully coat the surface with the water-based composition, the composition containing an effective amount of an alkoxylated acetylenic diol compound of the above structure for reducing the dynamic surface tension of the water-based composition.

There are significant advantages associated with the use of these alkoxylated acetylenic diols in water-based organic coatings, inks, fountain solutions for gravure printing processes, and agricultural compositions and these advantages include:

- an ability to formulate water-borne compositions which may be applied to a variety of substrates with excellent wetting of substrate surfaces including contaminated and low energy surfaces;
- an ability to provide a reduction in coating or printing defects such as orange peel and flow/leveling deficiencies;
- an ability to produce water-borne coatings, fountain solutions and inks which have low volatile organic content, thus making these alkoxylated acetylenic diol surfactants environmentally favorable;
- an ability to formulate coating, fountain solution and ink compositions capable of high speed application;
- an ability to control the foaming characteristics of the water-based compositions; and
- an ability to produce some members of the class using a chemical process similar to that used to produce acetylenic diol ethoxylates.

Because of their excellent surfactant properties and the ability to control foam, these materials are likely to find use in many applications in which reduction in dynamic and equilibrium surface tension and low foam are important. Such uses include various wet-processing textile operations, such as dyeing of fibers, fiber souring, and kier boiling, where low-foaming properties would be particularly advantageous; they may also have applicability in soaps, water-based perfumes, shampoos, and various detergents where their marked ability to lower surface tension while simultaneously producing substantially no foam would be highly desirable.

DETAILED DESCRIPTION OF THE INVENTION

This invention relates to compounds of the formulas A and B.

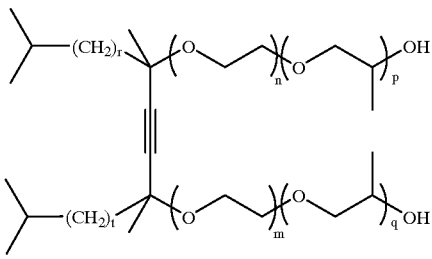

where (n+m) and (p+q) each can range from 1 to 30. It is preferred that (n+m) be 1.3 to 15 and most preferably 1.3 to 10. It is preferred that (p+q) be 1 to 10, more preferred 1–3 and most preferred 2. In Formula A, r and t are 1 or 2, especially r=t, i.e. the acetylenic diol portion of the molecule is 2,4,7,9-tetramethyl-5-decyne-4,7-diol or 2,5,8,11-tetramethyl-6-dodecyne-5,8-diol.

The alkylene oxide moieties represented by (OC2H4) are the (n+m) polymerized ethylene oxide (EO) units and those represented by (OC3H6) are the (p+q) polymerized propylene oxide (PO) units. Products in which the EO and PO units are each segregated together are referred to as "block" alkoxylate derivatives. The products in which the EO and PO units are randomly distributed along the polymer chain are referred to as "random" alkoxylate derivatives. Random derivatives can be represented by formula B

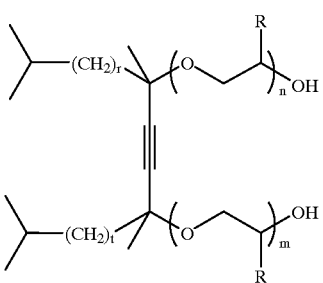

where R is hydrogen or methyl and (n+m)=2–60 with the proviso that the compound contain at least one ethylene oxide and at least one propylene oxide unit; and r and t are 1 or 2, especially r=t.

The block compositions of structure A can be prepared by reaction of 2,4,7,9-tetramethyl-5-decyne-4,7-diol or 2,5,8,11-tetramethyl-6-dodecyne-5,8-diol with the requisite quantities of ethylene oxide followed by propylene oxide in the presence of a suitable catalyst. Suitable catalysts include trialkylamines and Lewis acids, particularly $BF_3$. Alternatively, the compositions may be prepared by reaction of a pre-formed acetylenic diol ethoxylate with propylene oxide in the presence of an appropriate catalyst. In this case of a pre-formed acetylenic diol ethoxylate, it may be possible to use KOH or other alkali catalysts to effect the reaction with propylene oxide, provided the amount of ethylene oxide which has been added is sufficient to cover essentially all of the tertiary alcohol functionality.

The preferred process for making the acetylenic diol alkoxylates uses $BF_3$ or trialkylamine catalysts. The use of $BF_3$ allows the rapid preparation of derivatives containing relatively large quantities of propylene oxide. However, compositions prepared with trialkylamine catalysts, especially trimethylamine, are preferred for several reasons. They can be prepared using a process very similar to that used for manufacture of acetylenic dial ethoxylates without significant byproduct chemistry. In particular, trialkylamine catalysts allow for the preparation of 2 mole propylene oxide capped derivatives in high selectivity using a highly efficient, one pot process.

With respect to the processes for the preparation of acetylenic diol EO/PO adducts, the tertiary acetylenic diol starting materials can be prepared in various known manners such as those described in U.S. Pat. Nos. 2,250,445; 2,106,180 and 2,163,720, which are incorporated by reference. The acetylenic diol starting material may contain from 8 to 26 carbons. It is preferred that the acetylenic dial starting material contain 14 to 16 carbons, and it is most particularly preferred that it be 2,4,7,9-tetramethyl-5-decyne-4,7-diol or 2,5,8,11-tetramethyl-6-dodecyne-5,8-diol.

Various basic catalysts can be used to promote the reaction between the alkylene oxide and the acetylenic tertiary glycols in which the hydroxyl groups are attached to a carbon atom in a position alpha to the acetylenic bonds according to this invention. Tertiary aliphatic amines, namely trialkylamines such as trimethylamine, triethylamine, tripropylamine, dimethylethylamine, diethylmethylamine and the like, are particularly advantageous catalysts for the reaction. Such tertiary aliphatic amines catalyze the addition reaction at a rapid rate at moderately low temperatures and pressures without inducing cleavage of the acetylenic glycol. Trimethylamine is preferred because of its high catalytic activity and longevity in the reaction.

As is known in the art, the use of strongly basic catalysts such as sodium hydroxide, especially at high temperatures of about 150° C., induces cleavage of the acetylenic tertiary glycols and for this reason should be avoided, unless of course, sufficient ethylene oxide has been added to prevent substantial decomposition of tertiary acetylenic alcohol functionality. Once the tertiary hydroxyl groups of the acetylenic glycol have reacted with ethylene oxide, the resultant adduct exhibits the marked stability of an ether. So stable are the adducts that they can be heated with concentrated base such as sodium hydroxide at elevated temperatures, while comparable treatment of the initial acetylenic glycol is accompanied by extensive degradation. Consequently, strongly basic catalysts, such as the alkali metal hydroxides, can be used to increase the polyalkylene oxide chain length once the initial adducts have been formed and protected against decomposition. It is anticipated that alkali metal hydroxides could also be used to promote the addition of propylene oxide to initial EO or PO adducts with sufficiently low quantities of residual tertiary acetylenic alcohol functionality.

The trialkylamine-catalyzed addition reaction may be performed at either atmospheric (15 psig; 1 bar) or moderate to low superatmospheric pressures (30–300 psig; 2–20 bar). The use of moderate to low superatmospheric pressures is preferred since it obviates the necessity of recycling unreacted ethylene oxide and propylene oxide, and generally proceeds at faster rates than additions carried out at atmospheric pressures. The effect of pressure on rate is particularly important in the reaction with propylene oxide, and it is therefore preferred that reactions be performed at pressures in excess of 30 psig (2 bar). It is particularly preferred that the process be carried out at a pressure greater than 60 psig (4 bar). Another benefit of performing the reaction under pressure is that such reactions may be accomplished with ordinary efficient agitation, while reactions conducted at atmospheric pressure often work best when a dispersion type agitator is used. While the reaction can be carried out at lower pressure, reaction rates, and therefore reactor productivity, suffer. Performing the reaction at pressures much in excess of about 300 psig (20 bar) would likely have only marginal benefit, and would increase the cost of equipment required for manufacture. It is preferred to operate at 100 psig (6.7 bar).

The temperature at which the reaction is run for trialkylamine catalyzed reactions will depend upon the particular system and the catalyst concentration. Generally, at higher catalyst concentrations, the reactions can be run at lower temperatures and pressures. Reaction temperatures should be high enough to permit the reaction to proceed at a reasonable rate, but low enough to prevent decomposition of the reagents and products. Temperatures in the range of 40–150° C. are suitable, 50–120° C. preferred, and 70–90° C. particularly preferred.

In the trialkylamine catalyzed process in which propylene oxide is added to an acetylenic diol EO adduct, the reaction stops at a PO end cap on each chain, i.e., the obtained product is an acetylenic diol EO/PO adduct containing two PO end caps, p and q each being 1 in Formula A. When a mixture of EO and PO is added to an acetylenic diol or diol EO adduct, the trialkylamine catalyzed process affords an adduct having random EO and PO units, in the latter case extending beyond the original EO block.

To prepare the EO/PO adducts of the invention, the acetylenic glycol is liquefied by melting and the catalyst is added with stirring. Ethylene oxide and/or propylene oxide are added as liquids with stirring and the reaction is concluded when the desired polyalkylene oxide chain length is reached as determined by gel permeation chromatography (GPC), high performance liquid chromatography (HPLC), nuclear magnetic resonance (NMR), cloud point (ASTM D2024–65) or water titration of an isopropyl alcohol solution. No solvents are necessary during the reaction, but inert solvents such as aromatic hydrocarbons (benzene and toluene) and ethers (ethyl ether) may be used to facilitate handling. In some instances it may be convenient to use a low mole ethoxylated acetylenic diol, since these products are liquids and are therefore easy to handle.

In reactions catalyzed by Lewis acids, the reaction conditions will be determined by the identity and concentration of the catalyst. Examples of Lewis acid catalysts include $BCl_3$, $AlCl_3$, $TiCl_4$, $BF_3$, $SnCl_4$, $ZnCl_2$ and the like. The preferred Lewis acid catalyst is $BF_3$. In $BF_3$ catalyzed reactions, temperature control during the initial stages of the reaction is critical, since too high a temperature will result in dehydration of the acetylenic diol. It is preferred that the temperature be maintained below 80° C., preferably below 60° C., and most preferably below 50° C. The reaction pressure can range from atmospheric to low to moderate superatmospheric pressure, i.e., from 15 to 300 psig (1 to 20 bar). Because of the high activity of $BF_3$, good results can be obtained at more moderate pressures of about 1 bar than for those reactions performed using trialkylamine catalysts.

In adding liquid alkylene oxide(s) to the acetylenic glycol and the catalyst, care should be taken to avoid the presence of an excess of alkylene oxide(s) in the reaction mixture since the reaction is very exothermic and could prove to be very hazardous. The danger of an uncontrollable reaction can be avoided by adding the alkylene oxide(s) in a manner and at a rate such that the alkylene oxide(s) are reacted essentially as rapidly as they are introduced into the reaction mixture. The formation of a flammable mixture in the headspace is best avoided by pressuring the reactor headspace to a sufficient pressure with an inert gas such as nitrogen such that the alkylene oxide(s) remains below its lower explosive limit (LEL).

In the both the Lewis acid catalyzed and the trialkylamine catalyzed processes, the catalysts may be used at 0.001 to 10 wt %, preferably 0.01 to 5 wt %, and most preferably 0.1 to 1 wt %, based on total final reactant mass. In both cases, because deactivation may occur during the alkoxylation, it may be necessary to add additional catalyst to complete the reaction, particularly if large amounts of EO and PO are being added.

In the processes for making the randomly distributed EO/PO adducts, the EO and PO may be added to the reaction concurrently as separate charges or streams, or added as a single charge or stream comprising a mixture of EO and PO. In making block EO/PO adducts the EO and PO are added consecutively.

The alkoxylated acetylenic diols are useful for the reduction of equilibrium and dynamic surface tension in water-based compositions containing an organic compound, particularly aqueous coating, ink, fountain solution and agricultural compositions containing organic compounds such as polymeric resins, macromolecules, herbicides, insecticides or plant growth modifying agents. It is desirable that an aqueous solution of the alkoxylated acetylenic diol demonstrates a dynamic surface tension of less than 35 dynes/cm at a concentration of <0.5 wt % in water at 23° C. and 1 bubble/second according to the maximum-bubble-pressure method. The maximum-bubble-pressure method of measuring surface tension is described in *Langmuir* 1986, 2, 428–432, which is incorporated by reference.

In one aspect of the invention certain alkoxylated acetylenic diols of the above formula display excellent ability to reduce equilibrium and dynamic surface tension while producing substantially no foam.

The alkoxylated acetylenic diols are suitable for use in an aqueous composition comprising in water an inorganic compound which is a mineral ore or a pigment or an organic compound which is a pigment, a polymerizable monomer, such as addition, condensation and vinyl monomers, an oligomeric resin, a polymeric resin, a macromolecule such as gum arabic or carboxymethyl cellulose, a detergent, a caustic cleaning agent, a herbicide, especially a herbicide for chlorophyll-containing plants, an insecticide, or a plant growth modifying agent.

An amount of the alkoxylated acetylenic diol compound that is effective to reduce the equilibrium and/or dynamic surface tension of the water-based, organic or inorganic compound-containing composition is added. Such effective amount may range from 0.001 to 10 g/100 mL, preferably 0.01 to 1 g/100 mL, and most preferably 0.05 to 0.5 g/100 mL of the aqueous composition. Naturally, the most effective amount will depend on the particular application and the solubility of the particular alkoxylated acetylenic diol.

In the following water-based organic coating, ink, fountain solution and agricultural compositions containing an alkoxylated acetylenic diol according to the invention, the other listed components of such compositions are those materials well known to the workers in the relevant art.

A typical water-based protective or decorative organic coating composition to which the alkoxylated acetylenic diol surfactants of the invention may be added would comprise the following components in an aqueous medium at 30 to 80 wt % ingredients:

| Typical Water-Based Organic Coating Composition | |
|---|---|
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids/Defoamers |
| 0 to 50 wt % | Coalescing or Other Solvents |
| 0.01 to 10 wt % | Surfactant/Wetting Agent/Flow and Leveling Agents |
| 0.01 to 5 wt % | Acetylenic Diol EO/PO Derivative |

A typical water-based ink composition to which the alkoxylated acetylenic diol surfactants of the invention may be added would comprise the following components in an aqueous medium at 20 to 60 wt % ingredients:

| Typical Water-Based Ink Composition | |
|---|---|
| 1 to 50 wt % | Pigment |
| 0 to 50 wt % | Pigment Dispersant/Grind Resin |
| 0 to 50 wt % | Clay base in appropriate resin solution vehicle |
| 5 to 99.9 wt % | Water-Borne/Water-Dispersible/Water-Soluble Resins |
| 0 to 30 wt % | Coalescing Solvents |
| 0.01 to 10 wt % | Surfactant/Wetting Agent |
| 0.01 to 10 wt % | Processing Aids/Defoamers/Solubilizing Agents |
| 0.01 to 5 wt % | Acetylenic Diol EO/PO Derivative |

A typical water-based agricultural composition to which the alkoxylated acetylenic diol surfactants of the invention may be added would comprise the following components in an aqueous medium at 0.1 to 80 wt % ingredients:

| Typical Water-Based Agricultural Composition | |
|---|---|
| 0.1 to 50 wt % | Insecticide, Herbicide or Plant Growth Modifying Agent |
| 0.01 to 10 wt % | Surfactant |
| 0 to 5 wt % | Dyes |
| 0 to 20 wt % | Thickeners/Stabilizers/Co-surfactants/Gel Inhibitors/Defoamers |
| 0 to 25 wt % | Antifreeze |
| 0.01 to 50 wt % | Acetylenic Diol EO/PO Derivative |

A typical fountain solution composition for planographic printing to which the alkoxylated acetylenic diol surfactants of the invention may be added would comprise the following components in an aqueous medium at 30 to 70 wt % ingredients:

| Typical Fountain Solution for Planographic Printing | |
|---|---|
| 0.05 to 30 wt % | Film formable, water soluble macromolecule |
| 1 to 75 wt % | Alcohol, glycol, or polyol with 2–12 carbon atoms, water soluble or can be made to be water soluble |
| 0.01 to 60 wt % | Water soluble organic acid, inorganic acid, or a salt of thereof |
| 0.01 to 50 wt % | Acetylenic Diol EO/PO Derivative |

EXAMPLE 1

This example illustrates that two mole propoxylates of acetylenic diol ethoxylates can be prepared with high selectivity when using trialkylamine catalysts. In this example, the preparation of the 7 mole propoxylate of Surfynol® 465 surfactant, which is the 10 mole ethoxylate of 2,4,7,9-tetramethyl-4-decyne-4,7-diol, was attempted.

A 1000 mL autoclave was charged with Surfynol® 465 surfactant (300 g, 0.45 moles) and dimethylethylamine (53.7 g, 0.73 moles). The reactor was sealed, purged free of air with three nitrogen pressure-vent cycles, then pressured to 100 psig (6.7 bar) with nitrogen and heated to 120° C. Propylene oxide (183 g, 3.15 moles) was added over a period of 70 minutes by means of a syringe pump. At the completion of the addition, the reaction mixture was heated for an additional 12 hr at 120° C. The reactor contents were cooled and discharged. The product was heated under vacuum to remove volatiles (unreacted PO and catalyst), 68 g of material were removed.

Matrix assisted laser desorption/ionization mass spectrometry (MALD/I) indicated that almost all the individual oligomers in the product possessed one or two propylene oxide residues with only very small amounts of product containing three or more PO units. The fate of a substantial amount of the propylene oxide appeared to be formation of dimethylamino-terminated polypropyleneoxide.

These results are consistent with relatively facile reaction of primary hydroxyl with propylene oxide, but only very sluggish reaction of propylene oxide terminated chains. It appears that after EO-terminated chains react with one propylene oxide, chain growth essentially stops. Since there are approximately two EO chains for each starting acetylenic diol, high selectivity to the two mole propoxylate results. In this environment, decomposition of the catalyst to form dimethylamino-terminated polypropylene oxide is the predominant reaction.

It would not be anticipated based on the teachings of JP 2636954 B2 that trialkylamine catalysts would have any efficacy for promoting the reaction of propylene oxide. It would also not be anticipated that high selectivity to the two mole propoxylates of an acetylenic diol could be achieved.

EXAMPLES 2–5

Example 3 illustrates the preparation of the 3.5 mole ethoxylate of 2,4,7,9-tetramethyl-5-decyne-4,7-diol capped with 2 moles of propylene oxide using trimethylamine catalyst and a preformed ethoxylate. The 3.5 mole ethoxylate of 2,4,7,9-tetramethyl-5-decyne-4,7-diol is commercially available from Air Products and Chemicals, Inc. and is marketed as Surfynol® 440 surfactant.

A 1000 mL autoclave was charged with Surfynol® 440 surfactant (400 g, 1.05 moles) which had previously been dried by heating under nitrogen. The reactor was sealed and pressure checked, the air was removed with three nitrogen pressure-vent cycles, and trimethylamine (2.7 g, 0.5 wt % of final reaction mass) was added by means of a gas tight syringe. The reactor was pressured to 100 psig (6.7 bar) with nitrogen and heated to 100° C. whereupon propylene oxide (122 g, 147 mL, 2.10 moles) was added at a rate of 1.0 mL/min by means of a syringe pump. At the completion of the addition, the reactor contents were stirred at 100° C. for 14.5 hours. The reactor was cooled and the contents were discharged into a round bottomed flask and heated under vacuum (0.25 torr) at ambient temperature (ca. 23° C.) for 16 hours to remove the trimethylamine catalyst. The product was characterized by nuclear magnetic resonance (NMR) spectrometry. The data are summarized in Table 1 which shows acetylenic diol compositions prepared using trimethylamine catalysis.

Other ethylene oxide/propylene oxide derivatives of 2,4,7,9-tetramethyl-5-decyne-4,7-diol (Examples 2, 4 and 5)

were prepared in a similar manner. The compositions are also summarized in Table 1.

Since JP 2636954 B2 states that amines are inactive for the addition of propylene oxide, it would not be anticipated that trimethylamine would be an effective catalyst for the preparation of an EO/PO derivative of 2,4,7,9-tetramethyl-5-decyne-4,7-diol.

TABLE 1

| Example | Theoretical | | Determined by NMR | |
|---|---|---|---|---|
| | EO Moles | PO Moles | EO Moles | PO Moles |
| 2 | 1.3 | 2.0 | 1.5 | 1.9 |
| 3 | 3.5 | 2.0 | 3.9 | 1.8 |
| 4 | 5.1 | 2.0 | 5.9 | 2.0 |
| 5 | 10.0 | 2.0 | 10.7 | 2.0 |

EXAMPLES 6–21

These examples illustrate the preparation of ethylene oxide/propylene oxide derivatives of 2,4,7,9-tetramethyl-5-decyne-4,7-diol (designated S104) and 2,5,8,11-tetramethyl-6-dodecyne-5,8-diol (designated S124) using $BF_3$ catalyst. To our knowledge a procedure for the preparation of ethylene oxide/propylene oxide derivatives of acetylenic diols using Lewis acids such as $BF_3$ has not previously been disclosed. The procedure is illustrated for the preparation of the 5 mole ethylene oxide, 2 mole propylene oxide adduct of 2,4,7,9-tetramethyl-5-decyne-4,7-diol (S104) in which the EO and PO units are randomly situated along the alkylene oxide chain.

A 1000 mL autoclave was charged with the 1.3 mole ethylene oxide adduct of 2,4,7,9-tetramethyl-5-decyne-4,7-diol (313 g, 1.1 moles; Surfynol 104 surfactant from Air Products and Chemicals, Inc.) which had previously been dried by heating under vacuum. The reactor was sealed and pressure checked, the air was removed with three nitrogen pressure-vent cycles. The reactor was pressured to 100 psig (6.7 bar) with nitrogen, and the contents were heated to 40° C. $BF_3$ diethyl etherate (1.3 g) was added and ethylene oxide and propylene oxide were added simultaneously at rates of 91.05 mL/h and 68.95 mL/h, respectively, by means of two syringe pumps. The total amount of ethylene oxide (180 g, 204 mL, 4.08 moles) and propylene oxide (128 g, 155 mL, 2.2 moles) were such that the final mole ratio of diol:EO:PO was 1:5:2. After the completion of the addition, an additional 0.7 g of $BF_3$ diethyl etherate was added, whereupon an exotherm to 45.5° C. was observed. At this point gas chromatographic analysis indicated that the reaction was complete. The product (Example 6) was analyzed by NMR and MALD/I and found to have a structure consistent with the desired structure.

Sixteen similar materials (Examples 7–22) were prepared by variation of the diol structure, the amounts of ethylene oxide and propylene oxide, and the structural motif of the alkylene oxide chain. Table 2 shows the acetylenic diol compositions prepared using $BF_3$ catalysis. In Table 2, R designates "random," while B designates "block."

The composition of Example 22 has been disclosed in JP 03063187 A (however, JP '187 does not teach a method for its preparation nor whether the adduct is a block or random copolymer), and has been shown to have efficacy in fountain solutions for lithographic printing. The S82 designation corresponds to 3,6-dimethyl-4-hexyne-3,6-diol.

TABLE 2

| Example | Diol | R/B | Theoretical | | Determined by NMR | |
|---|---|---|---|---|---|---|
| | | | EO Moles | PO Moles | EO Moles | PO Moles |
| 6 | S104 | R | 5 | 2 | 6.5 | 2.9 |
| 7 | S104 | B | 5 | 2 | 5.5 | 2.2 |
| 8 | S104 | R | 5 | 10 | 3.2 | 11.5 |
| 9 | S104 | B | 5 | 10 | 3.5 | 11.1 |
| 10 | S104 | R | 15 | 2 | 16.2 | 2.2 |
| 11 | S104 | B | 15 | 2 | 14.4 | 2.1 |
| 12 | S104 | R | 15 | 10 | 17.3 | 8.6 |
| 13 | S104 | B | 15 | 10 | 15.0 | 9.7 |
| 14 | S124 | R | 5 | 2 | 6.9 | 3.2 |
| 15 | S124 | B | 5 | 2 | 4.8 | 2.2 |
| 16 | S124 | R | 5 | 10 | 8.0 | 7.6 |
| 17 | S124 | B | 5 | 10 | 5.1 | 10.0 |
| 18 | S124 | R | 15 | 2 | 16.3 | 1.9 |
| 19 | S124 | B | 15 | 2 | 14.9 | 2.1 |
| 20 | S124 | R | 15 | 10 | 15.4 | 9.3 |
| 21 | S124 | B | 15 | 10 | 13.6 | 8.1 |
| 22 | S82 | B | 10 | 2 | 9.6 | 1.9 |

The following Examples dynamic surface tension data were obtained for aqueous solutions of various compounds using the maximum bubble pressure method at bubble rates from 0.1 bubbles/second (b/s) to 20 b/s. The maximum bubble pressure measuring surface tension is described in Langmuir 1986, 2, 428–432. These e information about the performance of a surfactant at conditions from near-equilibrium (0.1 b/s) through extremely high surface creation rates (20 b/s). In practical bubble rates correspond to high printing speeds in lithographic printing, high spray or roller velocities in coating applications, and rapid application rates for agricultural products.

Comparative Example 25

Dynamic surface tension data were obtained for aqueous solutions of the composition of Example 22 (S82/10 EO/2PO/B) using the maximum bubble pressure technique. This material has been disclosed in JP 03063187 A and is taught as a component in an aqueous fountain solution composition. The surface tensions were determined at bubble rates from 0.1 bubbles/second (b/s) to 20 b/s. The data are presented in Table 3.

TABLE 3

| Dynamic Surface Tension (dyne/cm) - Example 22 | | | | | |
|---|---|---|---|---|---|
| Concentration (wt %) | 0.1 b/s | 1 b/s | 6 b/s | 15 b/s | 20 b/s |
| 0.1 | 39.1 | 42.3 | 46.5 | 51.6 | 53.0 |
| 1.0 | 34.4 | 34.9 | 35.5 | 37.7 | 38.5 |
| 5.0 | 33.8 | 34.0 | 34.7 | 36.3 | 36.4 |

The data illustrate that this product is reasonably effective at reducing the surface tension of water, although relatively high concentrations are required to obtain reasonable performance.

EXAMPLE 26

Solutions in distilled water of 10 mole EO/2 mole PO block derivative of 2,4,7,9-tetramethyl-5-decyne-4,7-diol (Example 5) were prepared and their dynamic surface tension properties were measured using the procedure described above. The data are set forth in the Table 4.

TABLE 4

Dynamic Surface Tension (dyne/cm) - Example 5

| Concentration (wt %) | 0.1 b/s | 1 b/s | 6 b/s | 15 b/s | 20 b/s |
|---|---|---|---|---|---|
| 0.1 | 40.5 | 42.0 | 44.3 | 47.1 | 48.1 |
| 0.5 | 32.4 | 33.6 | 35.1 | 36.6 | 37.2 |
| 1.0 | 29.8 | 30.5 | 32.1 | 33.0 | 33.7 |

These data illustrate that the composition of this invention is markedly superior in its ability to reduce surface tension relative to the composition of the prior art. Comparison of the data for the 1.0 wt % solution of the Example 5 surfactant with that of the 5.0 wt % solution of the S82 derivative (Example 22) shows that the compound of the invention provides superior performance at all surface creation rates at 20% the use level. Since reduction of dynamic surface tension is of such importance in a dynamic application in which aqueous fountain solutions are utilized, it would not be anticipated based on the teachings of the prior art that modification of the hydrophobic group (the acetylenic diol moiety) would have such an advantageous effect.

Comparative Examples 27–31

Solutions in distilled water of the 1.3, 3.5, 5.1 and 10 mole ethoxylates of 2,4,7,9-tetramethyl-5-decyne-4,7-diol were prepared. The 1.3, 3.5, and 10 mole ethoxylates are marketed by Air Products and Chemicals, Inc. as Surfynol® 420, 440, and 465 surfactants, respectively. Their dynamic surface tensions were measured using the procedure described above, and these data were used to determine the quantities provided in Table 5.

The $pC_{20}$ value is defined as the negative logarithm of the molar concentration of surfactant required to decrease the surface tension of an aqueous solution to 52.1 dyne/cm, that is, 20 dyne/cm below that of pure water when the measurement is performed at 0.1 b/s. This value is a measure of the efficiency of a surfactant. In general, an increase in $pC_{20}$ value of 1.0 indicates that 10 times less surfactant will be require to observe a given effect.

The critical aggregation concentrations (solubility limit or critical micelle concentration) were determined by intersection of the linear portion of a surface tension/ln concentration curve with the limiting surface tension as is described in many textbooks. The limiting surface tensions at 0.1 and 20 bubbles/second (b/s) represent the lowest surface tensions in water which can be achieved at the given surface creation rate for a given surfactant regardless of the amount of surfactant used. These values give information about the relative ability to a surfactant to reduce surface defects under near-equilibrium condition (0.1 b/s) through very dynamic conditions (20 b/s). Lower surface tensions would allow the elimination of defects upon application of a formulation onto lower energy surfaces.

The foaming properties of 0.1 wt % solutions of the prior art surfactants were examined using a procedure based upon ASTM D 1173-53. In this test, a 0.1 wt % solution of the surfactant is added from an elevated foam pipette to a foam receiver containing the same solution. The foam height is measured at the completion of the addition ("Initial Foam Height") and the time required for the foam to dissipate is recorded ("Time to 0 Foam"). This test provides a comparison between the foaming characteristics of various surfactant solutions. In general, in coatings, inks, and agricultural formulations, foam is undesirable because is complicates handling and can lead to coating and print defects, and to inefficient application of agricultural materials.

TABLE 5

| Structure | $pC_{20}$ | Sol Limit | limiting γ 0.1 b/s | limiting γ 20 b/s | γ(0.1% solution) 1 b/s | γ(0.1% solution) 6 b/s | RM Foam initial (t to 0) |
|---|---|---|---|---|---|---|---|
| Example 27 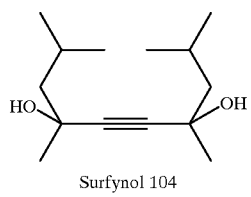 Surfynol 104 | 3.74 | 0.1 | 32.1 | 40.3 | 33.1 | 36.4 | 2.0 (3 s) |
| Example 28 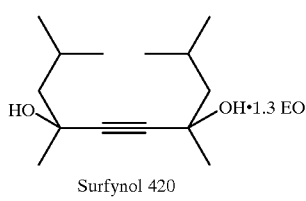 Surfynol 420 | 3.84 | 0.18 | 28.8 | 31.7 | 32.8 | 34.2 | 0.5 (3 s) |
| Example 29 | 3.90 | 0.29 | 26.9 | 29.3 | 34.3 | 36.2 | 1.4 (9 s) |

TABLE 5-continued

| Structure | pC$_{20}$ | Sol Limit | limiting γ 0.1 b/s | 20 b/s | γ(0.1% solution) 1 b/s | 6 b/s | RM Foam initial (t to 0) |
|---|---|---|---|---|---|---|---|
| 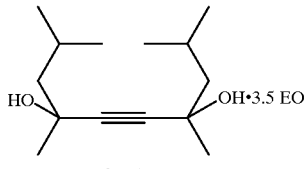 Surfynol 440 | | | | | | | |
| Example 30 | 3.95 | 0.40 | 26.9 | 29.8 | 36.1 | 38.3 | 1.3 (32 s) |
| 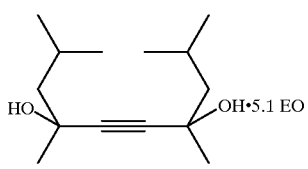 Surfynol 450 | | | | | | | |
| Example 31 | 3.79 | (0.89) | 29.0 | 32.7 | 42.5 | 44.8 | 1.5 (0.6 cm) |
| 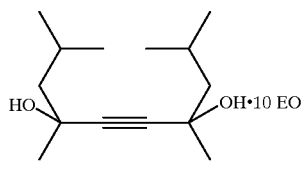 Surfynol 465 | | | | | | | |
| Example 32 | 3.43 | (2.91) | 35.7 | 39.9 | 51.5 | 53.2 | 1.5 (0.6 cm) |
| 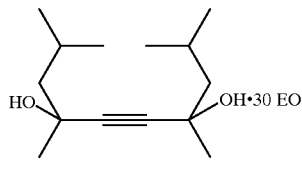 Surfynol 485 | | | | | | | |

EXAMPLES 33–36

Surface tension and foam data were obtained in a similar manner for the surfactants of Examples 1–4 based on 2,4,7,9-tetramethyl-5-decyne-4,7-diol. The data are set forth in Table 6.

TABLE 6

| Structure | pC$_{20}$ | Sol Limit | limiting γ 0.1 b/s | 20 b/s | γ (0.1% solution) 1 b/s | 6 b/s | RM Foam initial (t to 0) |
|---|---|---|---|---|---|---|---|
| Example 33 1.3 EO/2 PO (Example 2) | 3.51 | 0.07 | 31.6 | 40.6 | 33.4 | 40.6 | 1.6 (3 s) |
| Example 34 3.5 EO/2 PO (Example 3) | 4.07 | 0.21 | 29.3 | 31.4 | 33.6 | 36.6 | 1.0 (10 s) |
| Example 35 5.1 EO/2 PO (Example 4) | 4.13 | 0.32 | 27.3 | 29.9 | 35.3 | 37.6 | 0.3 (6 s) |
| Example 36 10 EO/2 PO (Example 5) | 4.05 | (0.78) | 29.8 | 33.7 | 42.0 | 44.3 | 2.1 (1.3) |

The data in Table 6 illustrate that propoxylation with 2 moles of propylene oxide in the presence of trimethylamine resulted in surfactants with higher efficiencies than their unpropoxylated counterparts. This effect is reflected in both the pC$_{20}$ values, which increase by about 0.2 units, and the surface tension results for 0.1 wt % solutions at 1 b/s, which decrease by about a dyne/cm. In addition, the foaming characteristics of the surfactants change significantly as a result of modification with propylene oxide. This change can be either in the direction of greater foam (e.g. for the 10 and 30 mole ethoxylates) or to lesser foam (for the 5.1 mole ethoxylate). The ability to control foam is advantageous in many applications, including coatings, inks, adhesives, fountain solutions, agricultural formulations, soaps and detergents.

EXAMPLES 37–52

Solutions in distilled water of the materials of Examples 37–52 were prepared and their surface tension and foam performance were evaluated as in the example above. The results are set forth in the Table 7.

TABLE 7

| Structure | $pC_{20}$ | CAG[c] | limiting γ[a] 0.1 b/s | 20 b/s | γ (0.1% solution)[a] 1 b/s | 6 b/s | RM Foam[b] initial (t to 0) |
|---|---|---|---|---|---|---|---|
| Example 37 104/5/2/R (Example 6) | 4.16 | 0.10 | 28.6 | 31.2 | 30.0 | 37.1 | 1.1 (5 s) |
| Example 38 104/5/2/B (Example 7) | 4.15 | 0.11 | 27.9 | 33.1 | 33.6 | 38.4 | 1.9 (4 s) |
| Example 39 104/5/10/R (Example 8) | 4.50 | 0.04 | 31.2 | 35.0 | 33.7 | 39.9 | 0.5 (1 s) |
| Example 40 104/5/10/B (Example 9) | 4.58 | 0.08 | 31.0 | 34.1 | 37.2 | 40.5 | 0.5 (10 s) |
| Example 41 104/15/2/R (Example 10) | 4.20 | 0.07 | 28.3 | 30.7 | 36.0 | 43.8 | 4.5 (1.1 cm) |
| Example 42 104/15/2/B (Example 11) | 5.04 | 0.18 | 27.6 | 31.7 | 36.8 | 42.9 | 5.3 (0.5 cm) |
| Example 43 104/15/10/R (Example 12) | 4.42 | 0.05 | 28.8 | 30.9 | 33.8 | 44.5 | 2.8 (0.7 cm) |
| Example 44 104/15/10/B (Example 13) | 4.35 | 0.09 | 28.3 | 34.4 | 35.5 | 45.6 | 4.0 (0.4 cm) |
| Example 45 124/5/2/R (Example 14) | 4.39 | 0.03 | 26.5 | 30.8 | 28.2 | 33.5 | 2.4 (0.2 cm) |
| Example 46 124/5/2/B (Example 15) | 4.42 | 0.04 | 26.9 | 29.7 | 28.5 | 32.5 | 3.0 (0.3 cm) |
| Example 47 124/5/10/R (Example 16) | 4.57 | 0.02 | 30.3 | 36.7 | 31.8 | 40.8 | 1.8 (0.3 cm) |
| Example 48 124/5/10/B (Example 17) | 4.56 | 0.02 | 31.3 | 36.2 | 33.4 | 40.3 | 1.4 (12 s) |
| Example 49 124/15/2/R (Example 18) | 4.36 | 0.06 | 27.9 | 32.2 | 30.5 | 40.8 | 2.6 (1.3 cm) |
| Example 50 124/15/2/B (Example 19) | 4.16 | 0.02 | 27.9 | 35.6 | 31.1 | 42.5 | 2.5 (1.2 cm) |
| Example 51 124/15/10/R (Example 20) | 4.58 | 0.06 | 29.1 | 32.3 | 32.8 | 43.2 | 2.0 (1.0 cm) |
| Example 52 124/15/10/B (Example 21) | 4.55 | 0.05 | 28.0 | 33.3 | 33.7 | 41.4 | 4.8 (1.0 cm) |

[a]dyne/cm.
[b]Ross-Miles foam: cm (time to 0 foam in seconds or cm after 5 minutes)
[c]Critical aggregation concentration (wt %).

These data illustrate variation of the acetylenic diol structure, the EO and PO content, and the structural motif of these surfactants allows tailoring of the surfactant properties to a specific application. Surfactants with very low foam (Examples 39 and 40) or relatively high foam (Examples 41 and 42) can be produced. In addition, most of these materials exhibit excellent dynamic surface tension performance, as shown by their limiting surface tension values at 20 b/s. The combination of properties will be of value in many applications, including coatings, inks, adhesives, fountain solutions, agricultural formulations, soaps and detergents.

EXAMPLE 53

2,4,7,9-Tetramethyl-5-decyne-4,7-diol was ethoxylated to produce the 5.1 mole ethoxylate using trimethylamine catalyst and a procedure similar to that of Examples 2–5. A small sample was withdrawn, and sufficient propylene oxide was added to produce the 0.4 mole propoxylate. Again a sample was withdrawn. Similarly, more propylene oxide was added to produce the 0.9 and 1.4 mole propylene oxide adducts. In a separate run, the 2.0 mole propoxylate of the 5.1 mole ethoxylate was prepared.

Surface tension and foam data were obtained for the propoxylates of 5.1 mole ethoxylate of 2,4,7,9-tetramethyl-5-decyne-4,7-diol as described above. The data are set forth in the Table 8.

TABLE 8

| | γ (0.1 wt % solution)[a] | | | | | RM Foam[b] |
|---|---|---|---|---|---|---|
| moles PO | 0.1 b/s | 1 b/s | 6 b/s | 15 b/s | 20 b/s | Initial (t to 0) |
| 0 | 35.1 | 36.2 | 38.1 | 42.0 | 44.4 | 1.6 (0.7 cm) |
| 0.4 | 34.8 | 35.8 | 37.9 | 42.0 | 44.4 | 1.4 (0.3 cm) |
| 0.9 | 34.9 | 35.9 | 38.2 | 42.7 | 45.3 | 1.4 (27 s) |
| 1.4 | 34.6 | 35.9 | 38.3 | 42.0 | 44.5 | 1.2 (21 s) |
| 2.0 | 34.0 | 35.3 | 37.6 | 41.5 | 43.3 | 0.6 (6 s) |

[a]dyne/cm
[b]Initial foam heights in cm (foam height after 5 min, or time to 0 foam).

The data in Table 8 show that while propoxylation has little impact on the surface tension performance of the 5.1 mole ethoxylate of 2,4,7,9-tetramethyl-5-decyne-4,7-diol, it has a significant positive impact on foam control, with greater control observed with higher degrees of propoxylation. Such an effect has not previously been observed with alkoxylated derivatives of acetylenic diols. The ability to control foam is of crucial importance in the application of many waterborne formulations, because foam generally leads to defects.

In sum, the ability of a surfactant to reduce surface tension under both equilibrium and dynamic conditions is of great importance in the performance of waterbased coatings, inks, adhesives, fountain solutions and agricultural formulations. Low dynamic surface tension results in enhanced wetting and spreading under the dynamic conditions of application, resulting in more efficient use of the formulations and fewer defects. Foam control is also an important attribute in many applications.

The family of surfactants disclosed in this invention provide an ability to control foam while providing excellent dynamic surface tension reduction. They will therefore have utility in applications such as coatings, inks, adhesives, fountain solutions, agricultural formulations, soaps and detergents.

STATEMENT OF INDUSTRIAL APPLICATION

The invention provides compositions suitable for reducing the equilibrium and dynamic surface tension in water-based coating, ink, fountain solution and agricultural compositions.

We claim:
1. In a method for applying a water-based composition to a surface to partially or fully coat the surface, the composition containing an inorganic or organic compound and an effective amount of a surfactant for reducing the dynamic surface tension of the composition, the improvement which comprises employing as the surfactant an acetylenic diol ethylene oxide/propylene oxide adduct of the structure

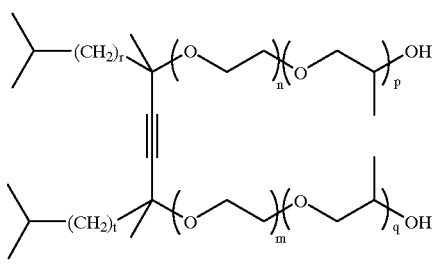

where r and t are 1 or 2, (n+m) is 1 to 30 and (p+q) is 1 to 30.

2. The method of claim 1 in which an aqueous solution of the acetylenic diol ethylene oxide/propylene oxide adduct demonstrates a dynamic surface tension of less than 35 dynes/cm at a concentration of ≦0.5 wt % in water at 23° C. and 1 bubble/second according to the maximum-bubble-pressure method, the adduct at 0.01 to 1 g/100 mL in the water-based composition.

3. The method of claim 1 in which the ethylene oxide and propylene oxide units are randomly distributed.

4. The method of claim 1 in which the ethylene oxide and propylene oxide units comprise blocks.

5. The method of claim 1 in which (n+m) is 1.3 to 15 and (p+q) is 1 to 10.

6. The method of claim 1 in which (n+m) is 1.3 to 10 and (p+q) is 1 to 3.

7. The method of claim 1 in which the acetylenic diol moiety is derived from 2,4,7,9-tetramethyl-5-decyne-4,7-diol.

8. The method of claim 1 in which the acetylenic diol moiety is derived from 2,5,8,11-tetramethyl-6-dodecyne-5,8-diol.

9. The method of claim 7 in which (n+m) is 1.3 to 10 and (p+q) is 1 to 3.

10. The method of claim 8 in which (n+m) is 1.3 to 10 and (p+q) is 1 to 3.

11. The method of claim 9 in which (p+q) is 2.

12. The method of claim 10 in which (p+q) is 2.

13. An aqueous composition comprising in water an inorganic compound which is a mineral ore or a pigment or an organic compound which is a pigment, a polymerizable monomer, an oligomeric resin, a polymeric resin, a detergent, a herbicide, an insecticide, or a plant growth modifying agent and an effective amount of an acetylenic diol ethylene oxide/propylene oxide adduct for reducing the dynamic surface tension of the composition, the acetylenic diol ethylene oxide/propylene oxide adduct having a structure according to the formula:

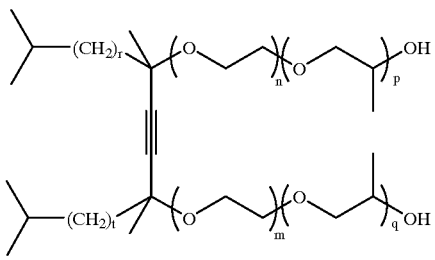

where r and t are 1 or 2, (n+m) is 1.3 to 30 and (p+q) is 1 to 3.

14. The composition of claim 13 in which (n+m) is 1.3 to 15.

15. The composition of claim 14 in which the acetylenic diol moiety is derived from 2,4,7,9-tetramethyl-5-decyne-4,7-diol.

16. The composition of claim 14 in which 2,5,8,11-tetramethyl-6-dodecyne-5,8-diol.

17. The composition of claim 15 in which (n+m) is 10 and (p+q) is 2.

18. The composition of claim 16 in which (n+m) is 10 and (p+q) is 2.

19. The composition of claim 13 which is an aqueous organic coating composition of 30 to 80 wt % components, which components comprise 0 to 50 wt % pigment dispersant, grind resin or mixtures thereof;

0 to 80 wt % coloring pigment, extender pigment, anti-corrosive pigment, other pigment types or mixtures thereof;

5 to 99.9 wt % water-borne, water-dispersible or water-soluble resin or mixtures thereof;

0 to 30 wt % slip additive, antimicrobial agent, processing aid, defoamer or mixtures thereof;

0 to 50 wt % coalescing or other solvents;

0.01 to 10 wt % surfactant, wetting agent, flow and leveling agents or mixtures thereof; and 0.01 to 5 wt % acetylenic diol ethylene oxide/propylene oxide adduct.

20. The composition of claim 13 which is an aqueous ink composition of 20 to 60 wt % components, which components comprise 1 to 50 wt % pigment;

0 to 50 wt % pigment dispersant, grind resin or mixtures thereof;

0 to 50 wt % clay base in a resin solution vehicle;

5 to 99 wt % water-borne, water-dispersible or water-soluble resin or mixtures thereof;

0 to 30 wt % coalescing solvent;

0.01 to 10 wt % processing aid, defoamer, solubilizing agent or mixtures thereof;

0.01 to 10 wt % surfactant, wetting agent or mixtures thereof; and 0.01 to 5 wt % acetylenic diol ethylene oxide/propylene oxide adduct.

21. The composition of claim 13 which is an aqueous agricultural composition of 0.1 to 80 wt % components, which components comprise 1 to 50 wt % a herbicide for chlorophyll-containing plants, insecticide, plant growth modifying agent or mixtures thereof;

0 to 5 wt % dye;

0 to 20 wt % thickener, stabilizer, co-surfactant, gel inhibitor, defoaming agent or mixtures thereof;

0 to 25 wt % antifreeze;

0 to 50 wt % coalescing or other solvents;

0.01 to 10 wt % surfactant; and 0.1 to 50 wt % acetylenic diol ethylene oxide/propylene oxide adduct.

22. The composition of claim 13 which is an aqueous fountain solution composition of 30 to 70 wt % components, which components comprise 0.05 to 30 wt % film formable, water soluble macromolecule;

1 to 75 wt % alcohol, glycol, or polyol with 2–12 carbon atoms, water soluble or can be made to be water soluble;

0.01 to 60 wt % water soluble organic acid, inorganic acid, or a salt of thereof;

0.01 to 50 wt % acetylenic diol ethylene oxide/propylene oxide adduct.

23. The composition of claim 22 in which the acetylenic diol ethylene oxide/propylene oxide adduct is 2,4,7,9-tetramethyl-5-decyne-4,7-diol adducted with moles ethylene oxide and 2 moles propylene oxide.

* * * * *

UNITED STATES PATENT AND TRADEMARK OFFICE
CERTIFICATE OF CORRECTION

PATENT NO. : 6,313,182 B1 Page 1 of 1
APPLICATION NO. : 09/304607
DATED : November 6, 2001
INVENTOR(S) : Kevin Rodney Lassila et al.

It is certified that error appears in the above-identified patent and that said Letters Patent is hereby corrected as shown below:

Title page, item [75] second inventor should read -- Paula Ann Uhrin --.

Signed and Sealed this

Twenty-ninth Day of January, 2008

JON W. DUDAS
*Director of the United States Patent and Trademark Office*